United States Patent [19]

Usui et al.

[11] Patent Number: 4,758,937
[45] Date of Patent: Jul. 19, 1988

[54] DC-DC CONVERTER

[75] Inventors: Hiroshi Usui, Tokyo; Koichi Morita, Fujimi, both of Japan

[73] Assignee: Sanken Electric Company, Ltd., Niiza, Japan

[21] Appl. No.: 4,143

[22] Filed: Jan. 15, 1987

[30] Foreign Application Priority Data

Jan. 16, 1986 [JP] Japan .................................. 61-6666
Jan. 16, 1986 [JP] Japan .................................. 61-6667

[51] Int. Cl.⁴ .......................................... H02M 3/335
[52] U.S. Cl. ......................................... 363/19; 363/97
[58] Field of Search ................................... 363/18–21, 363/97, 131; 331/112; 323/289

[56] References Cited

U.S. PATENT DOCUMENTS

| 4,573,112 | 2/1986 | Numata et al. | 363/19 |
| 4,649,464 | 3/1987 | Shono | 363/21 |
| 4,654,771 | 3/1987 | Stasch et al. | 363/19 |

FOREIGN PATENT DOCUMENTS

| 49-73615 | 7/1974 | Japan . | |
| 58-25581 | 2/1983 | Japan . | |
| 0116070 | 7/1983 | Japan | 363/19 |
| 59-148563 | 8/1984 | Japan . | |
| 2091457 | 7/1982 | United Kingdom | 363/19 |
| 1095328 | 5/1984 | U.S.S.R. | 363/19 |

Primary Examiner—Peter S. Wong
Attorney, Agent, or Firm—Woodcock Washburn Kurtz Mackiewicz & Norris

[57] ABSTRACT

A DC-DC converter for supplying stabilized DC power to a load comprises a transformer, a switch, first and second capacitors, a control circuit, and a rectifying and smoothing circuit. The transformer has a primary winding, a secondary winding and a tertiary winding. The primary winding of the transformer is connected in series to the switch. The secondary winding of the transformer is connected to the rectifying and smoothing circuit, and the tertiary winding is connected to a control terminal of the switch so as to drive the switch by positive feedback voltage. The first and second capacitors repeat charge and discharge periodically. When voltage of the first capacitor attains to the threshold voltage of the switch, the switch is converted from the OFF state into the ON state. When voltage of the second capacitor attains to the prescribed value, the control circuit converts the switch from the ON state into the OFF state. Circuit parts of the DC-DC converter is small in number. Further, the power loss of the DC-DC converter is little.

24 Claims, 12 Drawing Sheets

DC-DC CONVERTER

BACKGROUND OF THE INVENTION

The present invention relates to a DC-DC converter for supplying DC power to a load, and more specifically to a switching regulator for supplying regulated voltage to a load.

A typical switching regulator as disclosed in Japanese Laid Open Utility Model Application No. 58-25581 for example, comprises a primary winding of a transformer connected to a DC power source, a switching transistor connected in series to the primary winding, a secondary winding of the transformer, a rectifying and smoothing circuit connected between the secondary winding and a load, an error amplifier for comparing output voltage of the rectifying and smoothing circuit with reference voltage, a triangular wave generator, a comparator for comparing the triangular wave with the error output and forming PWM (pulse width modulation) signal, and a drive circuit connected to the comparator and the switching transistor. The DC-DC converter of PWM type is advantageous in that the switching transistor can be turned on or off stably at constant frequency, whereas it is disadvantageous in that since the triangular generator, the comparator and the drive circuit are required the cost becomes high.

Another typical switching regulator as disclosed in Japanese Laid Open Patent Application No. 59-148653 for example, comprises a primary winding of a transformer connected to a DC power source, a switching transistor connected in series to the primary winding, a secondary winding of the transformer, a rectifying and smoothing circuit connected between the secondary winding and a load, a tertiary winding connected between base and emitter of the switching transistor and coupled in electromagnetic coupling with the primary winding so as to drive the switching transistor, and a voltage control means. The switching transistor of the DC-DC converter having the tertiary winding is driven by positive feedback voltage obtained at the tertiary winding. Consequently, the circuit constitution of the DC-DC converter is simplified. In the DC-DC converter of positive feedback type, assuming that collector current of the switching transistor is $I_C$, base current is $I_B$ and current amplification factor is $h_{FE}$, when the collector current $I_C$ increases gradually and becomes $I_C = I_B \times h_{FE}$, the switching transistor is turned off. The output voltage is adjusted by varying amount of the base current $I_B$. For example, if the base current is decreased, the ON time width of the switching transistor is narrowed and the output voltage is lowered. The base current is adjusted by bypassing a part of the base current supplied from the tertiary winding to the switching transistor. Consequently, the bypassed current produces power loss. Further in the DC-DC converter of positive feedback type, when required power of the load is small (at light load), not only the ON time width of the transistor but also the OFF time width are narrowed thereby the ON/OFF repetition frequency of the switching transistor becomes high. As a result, the number of turning-on and turning-off per unit time of the switching transistor is increased thereby ratio of the power loss based on the switching to the total power loss is increased.

Japanese Laid Open Patent Application No. 49-73615 discloses a DC-DC converter which comprises a primary winding of a transformer connected to a DC power source, a switching transistor connected in series to the primary winding, a secondary winding of the transformer, a rectifying and smoothing circuit connected between the secondary winding and a load, a tertiary winding connected between base and emitter of the switching transistor and coupled in electromagnetic coupling with the primary winding so as to drive the switching transistor, a quartic winding coupled in electromagnetic coupling with the primary winding so as to control magnetic flux of the transformer, a switch for shortcircuiting quartic winding selectively. In the DC-DC converter having the quartic winding, if the time width for shortcircuiting the quartic winding is varied, time until the magnetic flux is returned to zero, i.e., reset time is varied. As a result, the OFF time width of the switching transistor is varied. In the DC-DC converter, however, the quartic winding and the short-circuit control circuit therefor are required thereby reduction of the cost becomes difficult.

SUMMARY OF THE INVENTION

An object of the invention is to provide a DC-DC converter wherein circuit constitution is simple and power loss is little.

Another object of the invention is to provide a DC-DC converter wherein even if DC output current, i.e., load current varies, the ON/OFF period of the switch is not significantly varied.

A DC-DC converter of the invention to attain the above objects comprises a pair of input terminals, a transformer, a switch, a rectifying and smoothing circuit, first and second capacitors, a charging means for the first capacitor, a charging and discharging means for the second capacitor, and a control circuit means. The transformer has a main winding, an auxiliary winding and a voltage output means, and the main winding is connected between the pair of input terminals through the switch. When voltage beyond the threshold voltage is applied to the control terminal of the switch based on the charging voltage of the first capacitor, the switch at the OFF state is turned on. If the switch is turned on, positive feedback voltage is obtained at the auxiliary winding and the switch is driven by sum of the positive feedback voltage and the voltage of the first capacitor or by the positive feedback voltage only. Charging of the second capacitor is started when the switch at the OFF state is turned on. When the voltage of the second capacitor attains to prescribed value, the control circuit means converts the switch from the ON state into the OFF state. The first and second capacitors repeat charge and discharge periodically, thereby the ON/OFF operation of the switch is produced. The rectifying and smoothing circuit converts the voltage obtained at the voltage output means into DC voltage.

The above and other objects, features and advantages of this invention and the manner of attaining them will become more apparent, and the invention itself will best be understood, from a study of the following description of preferred embodiments illustrated in the attached drawings.

BRIEF DESCRIPTION OF THE DRAWINGS

FIG. 9 is modified;

DESCRIPTION OF PREFERRED EMBODIMENTS

Figure 1:
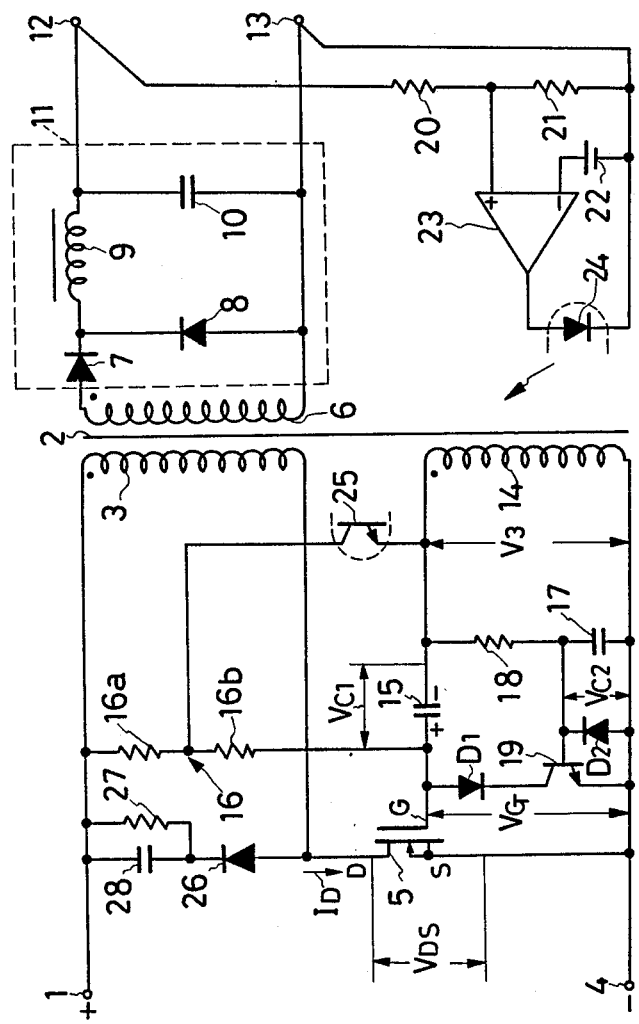
FIG. 1 is a circuit diagram of a DC-DC converter as a first embodiment of the invention.

FIG. 1 shows a DC-DC converter as a first embodiment of the invention. A primary winding 3 of a transformer 2 is connected between one input terminal 1 and other input terminal 4 for connection to a DC power source (not shown). N-channel MOS type field effect transistor (FET) 5 is connected in series to the primary winding 3 for voltage conversion. The FET 5 comprises drain connected to the primary winding 3, source connected to other input terminal 4, and gate to control the ON/OFF state between source and drain. Since the FET 5 has the threshold voltage $V_{TH}$, when voltage beyond the threshold voltage $V_{TH}$ is applied between gate and source the FET 5 is converted from the OFF state into the ON state.

In order to obtain output voltage corresponding to voltage or energy of the primay winding 3, a secondary winding 6 is coupled in electromagnetic coupling with the primary winding 3. A rectifying and smoothing circuit 11 connected between the secondary winding 6 and a pair of DC output terminals 12, 13 to connect a load (not shown), comprises two diodes 7, 8, a reactor 9 and a capacitor 10. A tertiary winding 14 coupled in electromagnetic coupling with the primary winding 3 is connected between gate and source so as to drive the FET 5.

A first capacitor 15 for converting the FET 5 from the OFF state into the ON state is connected between the tertiary winding 14 and gate of the FET 5. A first resistor 16 for charging the first capacitor 15 is connected between one input terminal 1 and the first capacitor 15. The first resistor 16 is divided into a first part 16a and a second part 16b.

A second capacitor 17 serving to convert the FET 5 from the ON state into the OFF state is connected in parallel to the tertiary winding 14 through a resistor 18. A diode $D_2$ is connected in parallel to the second capacitor 17 so that reverse charging voltage of the second capacitor 17 is made constant.

A control transistor 19 for converting the FET 5 from the ON state into the OFF state and discharging the second capacitor 17, comprises collector, emitter and base. Collector of the control transistor 19 is connected to gate of the FET 5 through a diode $D_1$ to inhibit the reverse current. Emitter of the transistor 19 is connected to source of the FET 5 and also to a lower terminal of the second capacitor 17. Base of the transistor 19 is connected to an upper terminal of the second capacitor 17.

In order to detect voltage between the pair of output terminals 12, 13, two resistors 20, 21 are connected between the pair of output terminals 12, 13. An error amplifier 23 has one input terminal connected to the voltage dividing point of the two resistors 20, 21, other input terminal connected to a reference voltage source 22, and an output terminal connected to a light emitting diode 24. The light emitting diode 24 emits light in response to output obtained from the error amplifier 23. A photo transistor 25 in photo-coupling with the light emitting diode 24 is connected in parallel to the first capacitor 15 and the part 16b of the first resistor 16. The photo transistor 25 controls the charging current of the first capacitor 15.

In order to reset residual magnetism of the transformer 2 by flyback voltage, a resistor 27 is connected in parallel to the primary winding 3 through a diode 26. In order to suppress the flyback voltage, a capacitor 28 is connected in parallel to the resistor 27.

Figure 2:
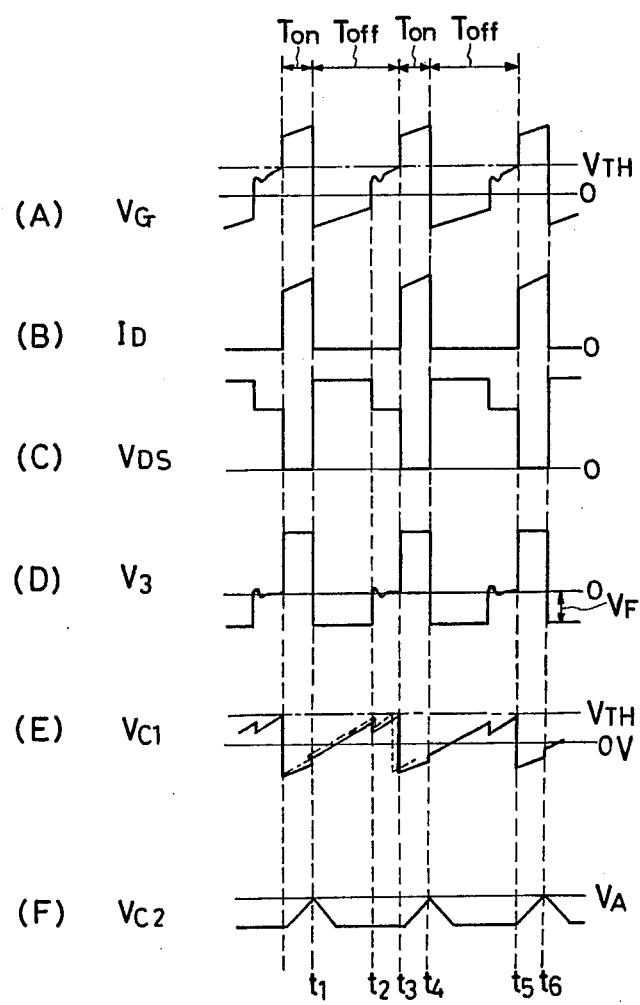
FIG. 2 is a waveform chart of the DC-DC converter in FIG. 1 illustrating gate voltage $V_G$, drain current $I_D$, drain-source voltage $V_{DS}$, tertiary winding voltage $V_3$, first capacitor $V_{c1}$ and second capacitor voltage $V_{c2}$.

The DC-DC converter of FIG. 1 acts as shown in voltage and current waveforms of FIG. 2. When DC voltage is applied to the pair of input terminals 1, 4, the charging current of the first capacitor 15 flows through the circuit composed of one input terminal 1, the first resistor 16, the first capacitor 15, the tertiary winding 14 and other input terminal 4. Voltage $V_{c1}$ of the first capacitor 15 increases slantwise as shown in FIG. 2(E). Since the voltage $V_{c1}$ of the first capacitor 15 is applied between gate and source of the FET 5, when the voltage $V_{c1}$ attains to the threshold voltage $V_{TH}$ of the FET 5, the FET 5 is converted from the OFF state into the ON state. During the ON period $T_{on}$ of the FET 5, most of the input voltage supplied between the pair of input terminals 1, 4 is applied to the primary winding 3. As a result, positive feedback voltage $V_3$ as shown in FIG. 2(D) is generated at the tertiary winding 14. Since the tertiary winding 14 is connected in series to the first capacitor 15, gate voltage $V_G$ of FIG. 2(A) corresponding to sum of the voltage $V_3$ of the tertiary winding 14 and the voltage $V_{c1}$ of the first capacitor 15 is applied between gate and source of the FET 5. As a result, the FET 5 is rendered conductive sufficiently. Current flows through capacitance between source and gate of the FET 5 based on the foward voltage obtained at the tertiary winding 14. Aa a result, the foward voltage of the tertiary winding 14 allows discharge of the first capacitor 15 and then charges the first capacifor 15 to the reverese polarity. Since the primary winding 3 has inductance, the drain current $I_D$ increases slantwise as shown in FIG. 2(B). Since voltage corresponding to the voltage of the primary winding 3 is induced at the secondary winding 6 during the ON period of the FET 5, DC output voltage corresponding to the voltage of the secondary winding 6 is obtained at output stage of the rectifying and smoothing circuit 11.

The voltage $V_3$ of the tertiary winding 14 during the ON period $T_{on}$ of the FET 5 serves also as power source to charge the second capacitor 17. The voltage $V_{c2}$ of the second capacitor 17 is charged to the positive polarity through the resistor 18 during period of $t_3 \sim t_4$ and period of $t_5 \sim t_6$ in FIG. 2(F). Gradient of the voltage $V_{c2}$ of the second capacitor 17 is determined by the charging time constant based on the resistor 18 and the capacitor 17. Since the transistor 19 has the threshold voltage, even if the charging of the second capacitor 17 is started, the transistor 19 is not immediately turned on. When the voltage $V_{c2}$ of the second capacitor 17 becomes the threshold voltage $V_A$ of the transistor 19 at time $t_1$, $t_4$ or $t_6$ as shown in FIG. 2(F), the transistor 19 is converted from the OFF state into the ON state. As a result, the transistor 19 short-circuits between gate and source of the FET 5, and also constitutes the charge circuit of the first capacitor 15. If the FET 5 is shortcircuited between gate and source by the transistor 19, the FET 5 is converted from the ON state into the OFF state. During the OFF period $T_{off}$ of the FET 5, reset operation of the transformer 2 is produced. That is, current flows through the closed circuit composed of the primary winding 3, the diode 26 and the resistor 27, thereby the transformer 2 is reset. Based on the reset operation of the transformer 2, reverse voltage, i.e., flyback voltage $V_F$ is generated at the tertiary winding 14 as shown in FIG. 2(D). The flyback voltage $V_F$ applies reverse bias to the FET 5 between gate and source. Further, the reverse voltage of the tertiary winding 14 allows discharge of the capacitor 17 and then charges the capacitor 17 to the reverse polarity.

If the reset of the transformer 2 is finished at time $t_2$, the voltage $V_3$ of the tertiary winding 14 becomes zero. However, since the gate voltage $V_G$ is less than the threshold voltage $V_{TH}$ at time $t_2$, the FET 5 is not turned on at the time $t_2$. When the voltage $V_{c1}$ of the first capacitor 15 attains to the threshold voltage $V_{TH}$, the FET 5 is converted from the OFF state into the ON state. In other words, the charging time constant of the capacitor 15 is set to sufficiently large value so that the voltage $V_{c1}$ of the first capacitor 15 does not attain to the threshold voltage $V_{TH}$ during the generating period $(t_1 \sim t_2)$ of the flyback voltage $V_F$.

The first capacitor 15 is charged during the ON state and OFF state of the FET 5. Current flows through capacitance between source and gate of the FET 5 based on the reverse voltage obtained at the tertiary winding 14, i.e., the flyback voltage $V_F$. As a result, the first capacitor 15 is charged by voltage between the pair of input terminals 1, 4 and also by current flowing between source and gate. Amount of the flyback voltage $V_F$ obtained at the tertiary winding 14 is proportional to amount of the ON periods $T_{on}$ of the FET 5 and the drain current $I_D$. Consequently, if the ON period $T_{on}$ of the FET 5 is long, the charging current of the first capacitor 15 becomes large and the voltage $V_{c1}$ of the first capacitor 15 rapidly attains to the threshold voltage $V_{TH}$. Since the OFF period $T_{off}$ of the FET 5 varies in reverse proportion to the ON period $T_{on}$, variation of the ON/OFF period of the FET 5 is small.

If it is assumed that the voltage between the output terminals 12, 13 becomes lower than desired value, the output voltage of the error amplifier 23 becomes low and the light quantity of the diode 24 also becomes low. As a result, resistance of the photo transistor 25 becomes high and the bypass current flowing through the photo transistor 25 decreases, whereas the charging current of the first capacitor 15 increases. Since the charging current increases, the voltage $V_{c1}$ of the first capacitor 15 rapidly rises as shown in broken line of FIG. 2(E) and attains to the threshold voltage $V_{TH}$. Consequently, the OFF period $T_{off}$ becomes short, and the DC output voltage is returned to the desired value. When the DC output voltage is higher than the desired value, reverse operation to the above description regarding the lower voltage is effected.

As clearly understood from the above description, the DC-DC converter in FIG. 1 has advantages as follows:

(1) Conversion time of the FET 5 from the OFF state into the ON state is determined by the charging voltage $V_{c1}$ of the first capacitor 15, and conversion time from the ON state into the OFF state is determined by the charging voltage $V_{c2}$ of the capacitor 17. Consequently, the ON/OFF period $(T_{on} + T_{off})$ of the FET 5 is not significantly varied corresponding to variation of the load current. At light load state where the load current is small, the ON/OFF period $(T_{on} + T_{off})$ of the FET 5 does not become short but becomes long, thereby the ON/OFF repetition number per unit time of the FET 5, i.e., the switching number decreases and ratio of the power loss of the FET 5 by the switching to the total power loss decreases.

(2) Since the triangular wave generator and the voltage comparator are not used, the circuit constitution is simplified.

(3) Charge and discharge of the second capacitor 17 are performed depending on the voltage of the tertiary winding 14. Consequently, starting of the charge of the second capacitor 17 is accurately synchronized with the conversion of the FET 5 from the OFF state into the ON state.

(4) The diode $D_2$ connected in parallel to the second capacitor 17 is turned on by the flyback voltage of the tertiary winding 14, i.e., the reverse voltage. Consequently, voltage value of the second capacitor 17 charged in reverse direction based on the flyback voltage is limited to be coincident to the forward voltage drop of the diode $D_2$.

(5) The transistor 19 is turned on instantaneously at the conversion of the FET 5 from the ON state into the OFF state, and rendered off at other period. Consequently, the power loss in the transistor 19 is little.

Figure 3:
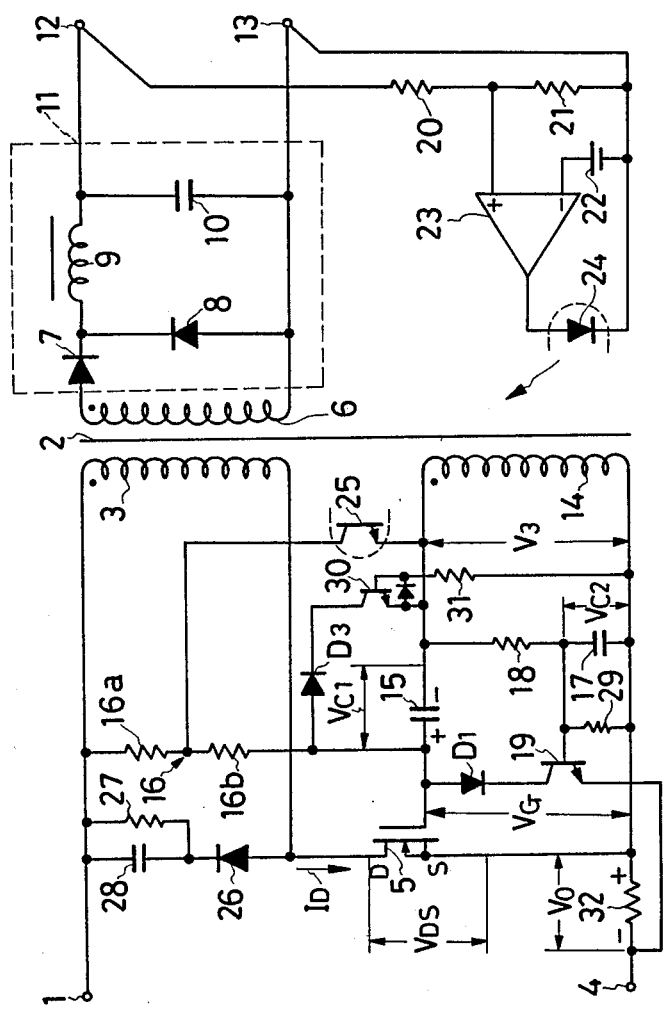
FIG. 3 is a circuit diagram of a DC-DC converter as a second embodiment of the invention.
Figure 4:
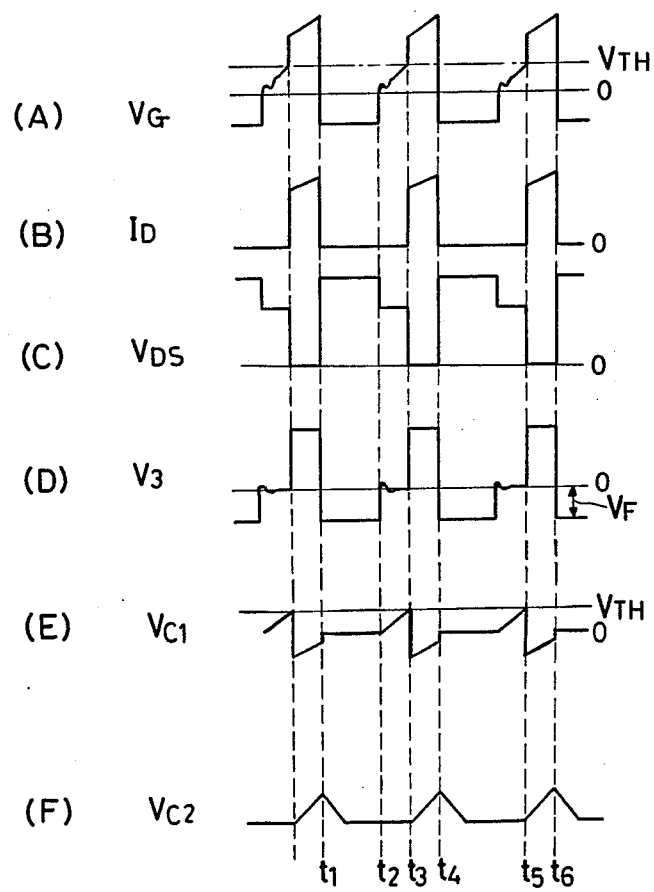
FIG. 4 is a waveform chart of the DC-DC converter in FIG. 3 illustrating gate voltage $V_G$, drain current $I_D$, drain-source voltage $V_{DS}$, tertiary winding voltage $V_3$, first capacitor voltage $V_{c1}$ and second capacitor voltage $V_{c2}$.

FIG. 3 shows a DC-DC converter as a second embodiment of the invention. Many parts in FIG. 3 are coincident to that in FIG. 1. Consequently, parts in FIG. 3 corresponding to that in FIG. 1 are designated by the same reference numerals. The DC-DC converter in FIG. 3 further comprises a resistor 29, a transistor 30, a diode $D_3$, a resistor 31 and a current detecting resistor 32. The transistor 30 is connected in parallel to the first capacitor 15 through the diode $D_3$. Emitter of the transistor 30 is connected to one end of the tertiary winding 14, and base thereof is connected to other end of the tertiary winding 14 through the resistor 31. The transistor 30 performs the ON/OFF operation periodically in response to the voltage of the tertiary winding 14. As shown in FIG. 4(D), when the flyback voltage $V_F$ is generated at the tertiary winding 14 the transistor 30 is turned on. As a result, the discharging current of the first capacitor 15 flows through the transistor 30. Charge of the first capacitor 15 is started after the generation of the flyback voltage $V_F$ is finished as shown in FIG. 4(E). Consequently, attaining of the voltage $V_{c1}$ of the first capacitor 15 to the threshold voltage $V_{TH}$ is entirely inhibited before the reset of the transformer 2 is finished.

When the reset of the transformer 2 is finished, oscillating voltage is generated at respective windings 3, 6 and 14. If the oscillating voltage of large level in the positive direction is generated at the tertiary winding 14 in the state that the first capacitor 15 is omitted, the FET 5 in response to the oscillating voltage may be turned on. However, since the DC-DC converter of FIG. 3 has the first capacitor 15 and the transistor 30, the FET 5 is not turned on due to the oscillating voltage. Since the first capacitor 15 is shortcircuited by the transistor 30 immediately before the generation of the oscillating voltage, the voltage of the first capacitor 15 during the generation of the oscillating voltage is quite small and therefore sum of the voltage $V_{c1}$ of the first capacitor 15 and the oscillating voltage of the tertiary winding 14 does not attain to the threshold voltage $V_{TH}$ of the FET 5. The transistor 30 is turned off in synchronization with ending of the generating period ($t_1 \sim t_2$) of the flyback voltage $V_F$ in FIG. 4, and the charging of the first capacitor 15 is started.

The resistor 32 for detecting current of the FET 5 is connected between source of the FET 5 and other input terminal 4. Emitter of the transistor 19 is connected to the left end of the current detecting resistor 32. Consequently, sum of the voltage $V_{c2}$ of the second capacitor 17 and the voltage $V_o$ across the current detecting resistor 32 is applied between base and emitter of the transistor 19. If the current of the FET 5 increases, the voltage $V_o$ of the current detecting resistor 32 will become high. As a result, the transistor 19 is turned on early with respect to the time that the charging of the second capacitor 17 in the positive direction is started, thereby the ON time width of the FET 5 is narrowed. The resistor 29 connected in parallel to the second capacitor 17 has similar function to that of the diode $D_2$ in FIG. 1.

Figure 5:
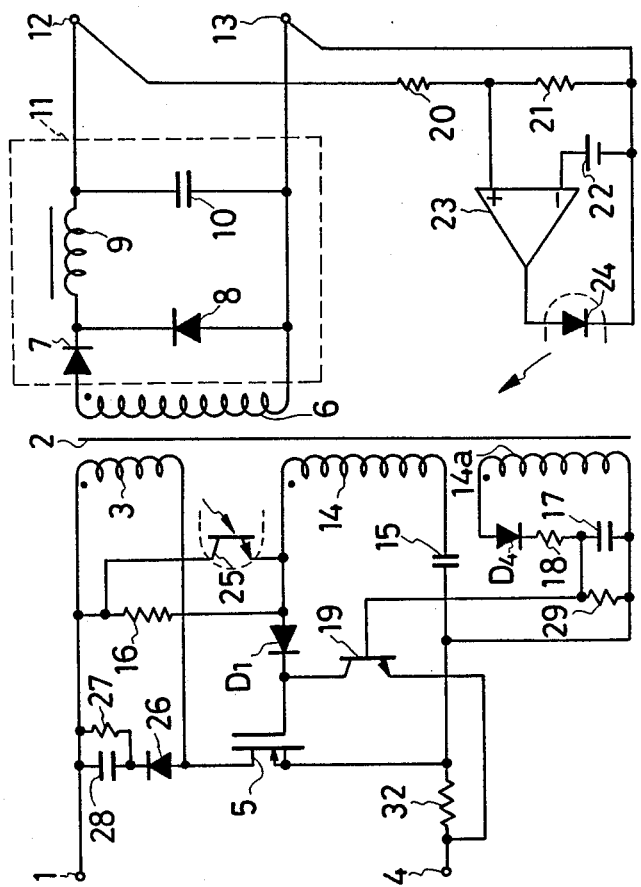
FIG. 5 is a circuit diagram of a DC-DC converter as a third embodiment of the invention.

FIG. 5 shows a DC-DC converter as a third embodiment of the invention. In FIG. 5, parts corresponding to that in FIG. 1 and FIG. 3 are designated by the same reference numerals. In FIG. 5, the first capacitor 15 is connected between the tertiary winding 14 and source of the FET 5. Even when the connection position of the first capacitor 15 is changed as above described, the first capacitor 15 acts in similar manner to that in FIG. 1 and FIG. 3. A quartic winding 14a is coupled in electromagnetic coupling with the primary winding 3, and the second capacitor 17 is connected in parallel to the quartic winding 14a through the resistor 18 and a diode $D_4$. The diode $D_1$ is transferred to position between one end of the tertiary winding 14 and gate of the FET 5.

Figure 6:
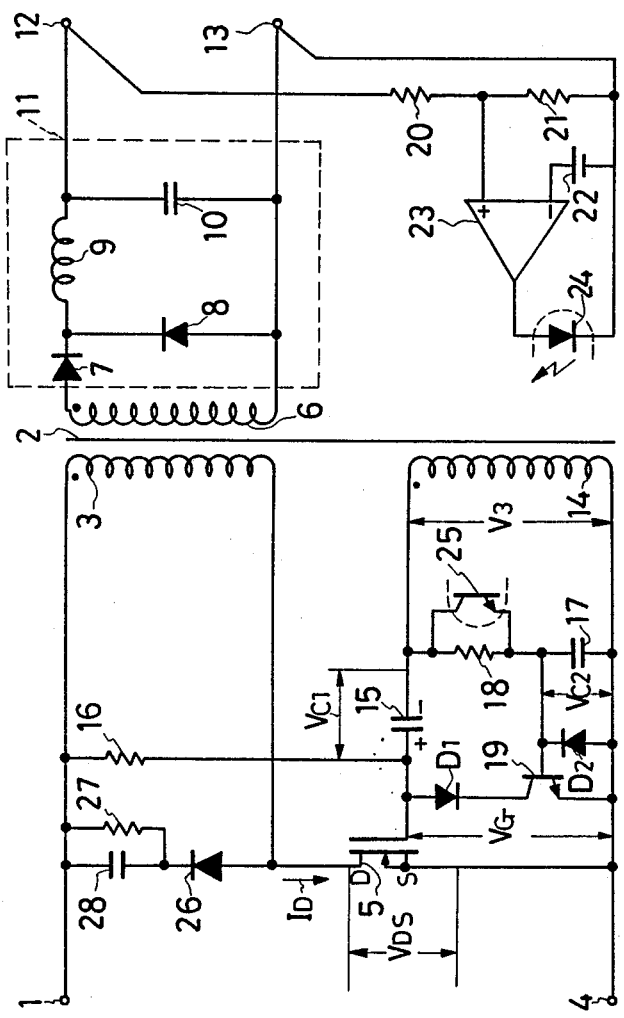
FIG. 6 is a circuit diagram of a DC-DC converter as a fourth embodiment of the invention.
Figure 7:
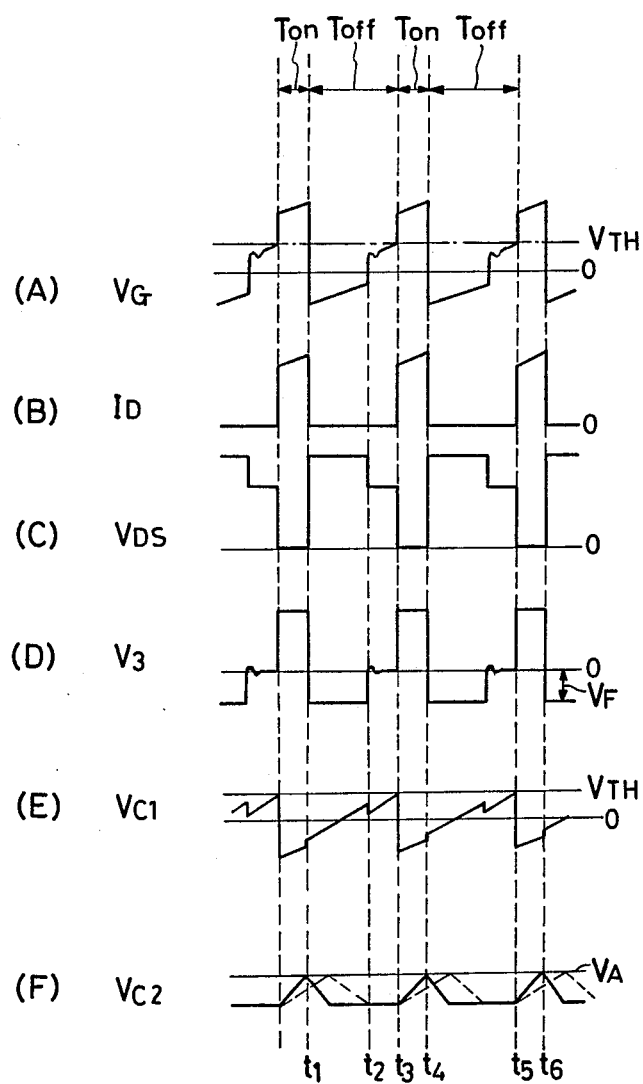
FIG. 7 is a waveform chart of the DC-DC converter in FIG. 6 illustrating gate voltage $V_G$, drain current $I_D$, drain . source voltage $V_{DS}$, tertiary winding voltage $V_3$, first capacitor voltage $V_{c1}$ and second capacitor voltage $V_{c2}$.

FIG. 6 shows a DC-DC converter as a fourth embodiment of the invention. In FIG. 6, parts corresponding to that in FIG. 1 are designated by the same reference numerals. FIG. 6 is different from FIG. 1 in that the photo transistor 25 is connected in parallel to the second resistor 18. The photo transistor 25 controls the charging current of the second capacitor 17. The DC-DC converter of FIG. 6 acts in similar manner to the DC-DC converter of FIG. 1 except for the operation to control the output voltage. If the output voltage becomes lower than the desired value, output voltage of the error amplifier 23 is lowered and light quantity of the light emitting diode 24 is decreased thereby resistance value of the photo transistor 25 is increased. As a result, the charging current of the second capacitor 17 is decreased, and the voltage $V_{c2}$ of the second capacitor 17 is increased slowly as shown in dotted line of FIG. 7(F) thereby the time of the voltage $V_{c2}$ attaining to the threshold voltage $V_A$ of the transistor 19 becomes long. Consequently, the ON time width $T_{on}$ of the FET 5 also becomes long.

Figure 8:
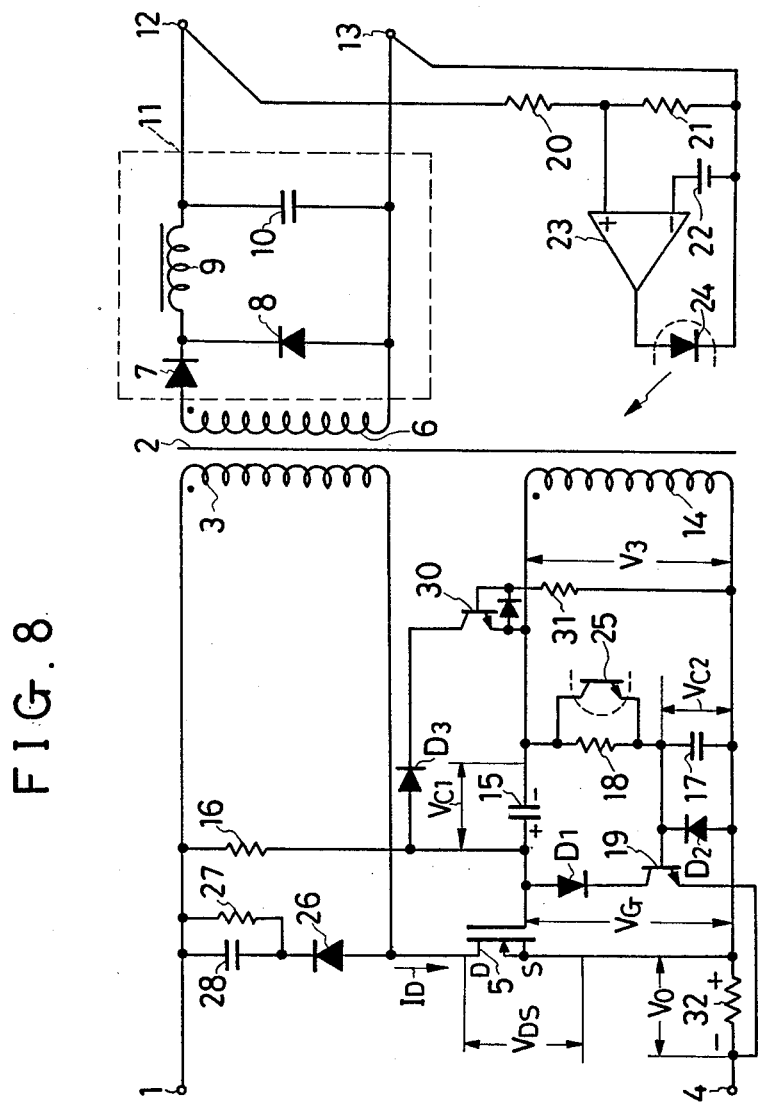
FIG. 8 is a circuit diagram of a DC-DC converter as a fifth embodiment of the invention.

FIG. 8 shows a DC-DC converter as a fifth embodiment of the invention. In FIG. 8, parts corresponding to that in FIG. 1 and FIG. 3 are designated by the same reference numerals. In the DC-DC converter of FIG. 8, the photo transistor 25 is connected in parallel to the resistor 18. Consequently, the adjusting method of the output voltage is similar to that in FIG. 6. The transistor 30 connected in parallel to the first capacitor 15 acts in similar manner to that in FIG. 3. Consequently, voltage and current waveforms in various parts of FIG. 8 are substantially the same as that of FIG. 4.

Figure 9:
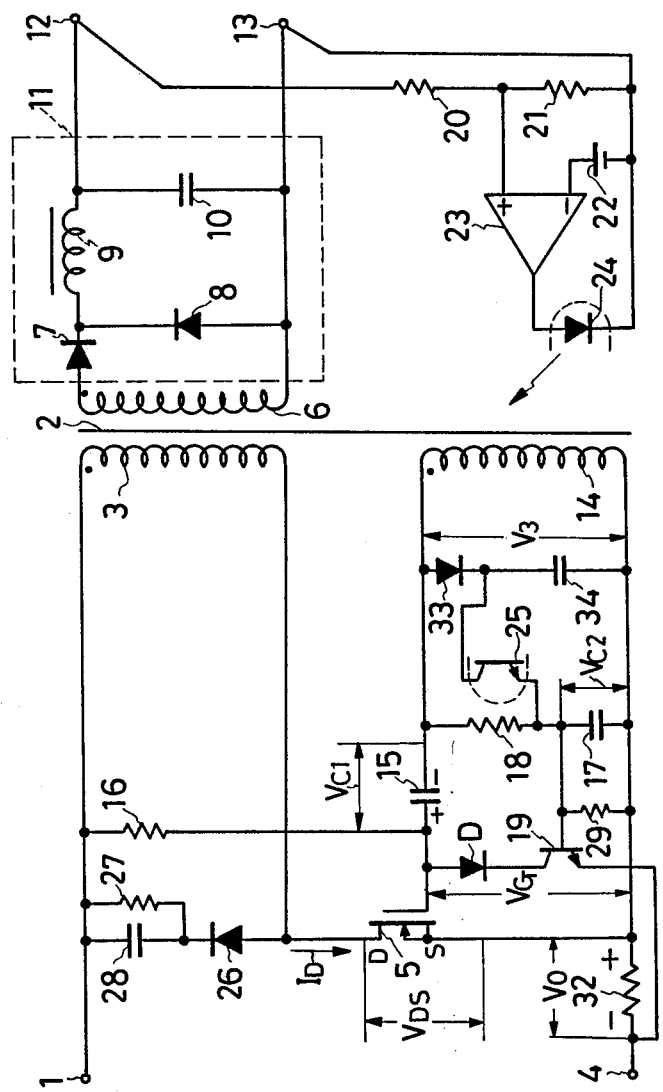
FIG. 9 is a circuit diagram of a DC-DC converter as a sixth embodiment of the invention.

FIG. 9 shows a DC-DC converter as a sixth embodiment of the invention. In FIG. 9, parts corresponding to that in FIG. 1 and FIG. 8 are designated by the same reference numerals. In FIG. 9, the DC power source circuit composed of a diode 33 and a capacitor 34 is connected in parallel to the tertiary winding 14. The photo transistor 25 is connected between the power source capacitor 34 and the second capacitor 17. Consequently, the second capacitor 17 is charged by both current flowing through the resistor 18 and current flowing through the photo transistor 25. The transistor 19 is controlled by sum of the voltage $V_o$ of the current detecting resistor 32 and the voltage $V_{c2}$ of the second capacitor 17 in similar manner to FIG. 3 and FIG. 8.

Figure 10:
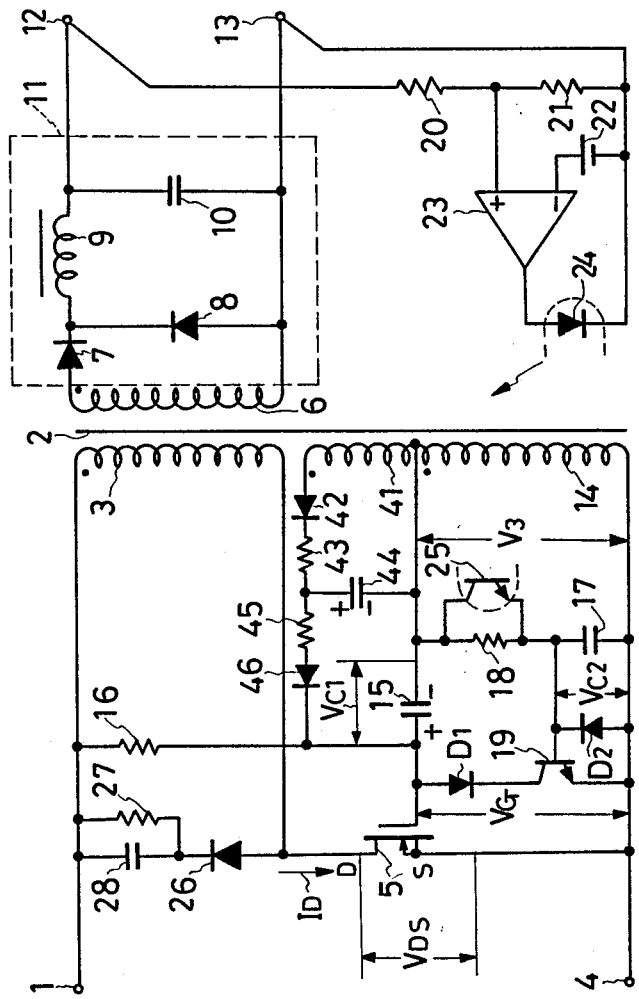
FIG. 10 is a circuit diagram of a DC-DC converter as a seventh embodiment of the invention.

FIG. 10 shows a DC-DC converter as a seventh embodiment of the invention. In FIG. 10, parts corresponding to that in FIG. 1 and FIG. 6 are designated by the same reference numerals. The DC-DC converter of FIG. 10 has the main charging circuit comprising the resistor 16 and also an auxiliary charging circuit. The auxiliary charging circuit comprises a quartic winding 41 coupled in electromagnetic coupling with the primary winding 3, a power source capacitor 44 connected in parallel to the quartic winding 41 through a diode 42 and a resistor 43, and a resistor 45 and a diode 46 for connecting the power source capacitor 44 to the first capacitor 15. The first capacitor 15 is charged by current flowing through the resistor 16 and also by current flowing through the resistor 45 and the diode 46 based on the power source capacitor 44. Consequently, the current flowing through the resistor 16 may be set to small value thereby the power loss in the resistor 16 is decreased. The auxiliary charging circuit comprising the quartic winding 41 and the capacitor 44 as shown in FIG. 10 can be connected to the DC-DC converters in FIG. 1, FIG. 3, FIG. 5, FIG. 8 and FIG. 9.

Figure 11:
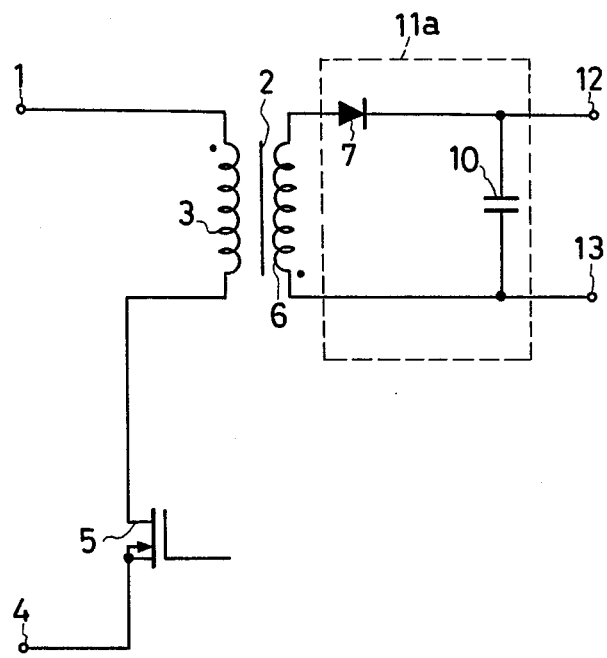
FIG. 11 is a circuit diagram of a part of a DC-DC converter where the transformer and the rectifying and smoothing circuit shown in FIG. 1, FIG. 3, FIG. 5, FIG. 6, FIG. 8, FIG. 9 or FIG. 10 are modified.

The preferred embodiments disclosed herein are meant purely to illustrate or explain and not to impose limitations upon the invention, as a variety of modifications will readily occur to the specialists on the basis of this disclosure. The following is a brief list of such possible modifications:

(1) As shown in FIG. 11, the polarity of the secondary winding may be reversed to that in FIG. 1, FIG. 3, FIG. 5, FIG. 6, FIG. 8, FIG. 9 or FIG. 10. The rectifying and smoothing circuit 11a in this case comprises the diode 7 and the capacitor 10. The diode 7 is turned off during the ON period of the FET 5, and turned on during the OFF period of the FET 5. Consequently, the energy stored in the transformer 2 during the ON period of the FET 5 is discharged through the diode 7 during the OFF period of the FET 5.

Figure 12:
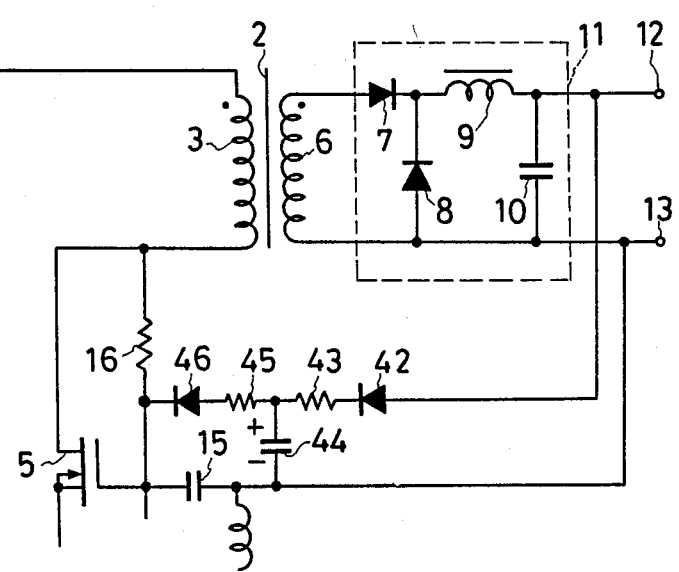
FIG. 12 is a circuit diagram of a part of a DC-DC converter where the charging circuit of the first capacitor shown in FIG. 1, FIG. 3, FIG. 5, FIG. 6, FIG. 8

(2) The auxiliary charging circuit for the first capacitor 15 may be constituted as shown in FIG. 12. The auxiliary charging circuit in FIG. 12 comprises the capacitor 44 connected between the output terminals 12, 13 through the diode 42 and the resistor 43, and the resistor 45 and the diode 46 to connect the capacitor 44 to the first capacitor 15. One end of the resistor 16 is connected between the primary winding 3 and the FET 5.

Figure 13:
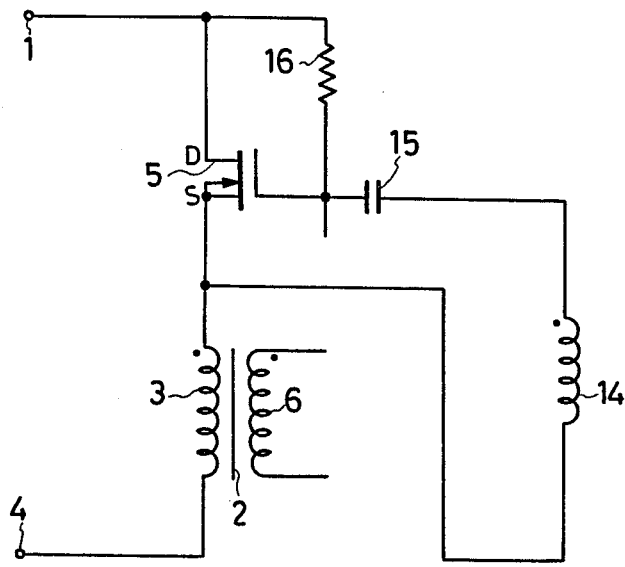
FIG. 13 is a circuit diagram of a part of a DC-DC converter in modification where a transformer is connected to source of a field effect transistor.

(3) As shown in FIG. 13, the transformer 2 may be connected between source of the FET 5 and other input terminal 4.

Figure 14:
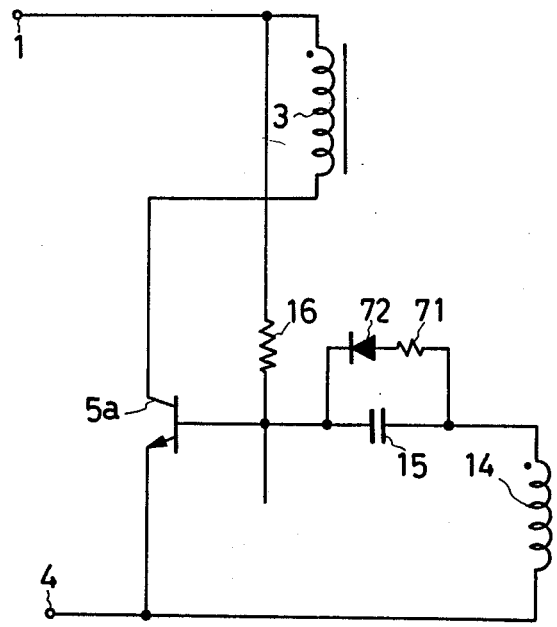
FIG. 14 is a circuit diagram of a part of a DC-DC converter where a bipolar transistor is used in place of the field effect transistor.

(4) As shown in FIG. 14, a bipolar transistor 5a may be used in place of the FET 5. In FIG. 14, the tertiary winding 14 is connected between base and emitter of the transistor 5a through the first capacitor 15. A resistor 71 is connected in parallel to the first capacitor 15 through a diode 72. Base current supplied to the transistor 5a based on the tertiary winding 14 flows through the resistor 71 and the diode 72.

(5) In place of the FET 5 in FIG. 1, a photo transistor may be connected between the primary winding 3 and the power source terminal 4, and may be controlled by a light emitting diode. In this case, the light emitting diode is controlled based on the first and second capacitors 15, 17.

(6) The transistor 19 may be made FET.

(b 7) The transformer 2 may be made auto-transformer.

What is claimed is:

1. A DC-DC converter for supplying DC power to a load, comprising:
   (a) a pair of input terminals for connection to a DC power source;
   (b) a switch, connected between the pair of input terminals, and having a control terminal and a threshold voltage, said switch being converted from an OFF state into an ON state when voltage greater than or equal to the threshold voltage of the switch is applied to the control terminal;
   (c) a transformer having a main winding, an auxiliary winding and a voltage output means, said main winding being connected in series to the switch, said auxiliary winding being connected to the control terminal for supplying positive feedback voltage to the control terminal;
   (d) a rectifying and smoothing circuit connected between the voltage output means of the transformer and the load for supplying a DC output voltage to the load;
   (e) a first capacitor connected to the switch, a charge voltage of said first capacitor converting the switch from the OFF state into the ON state;
   (f) a charging means for charging the first capacitor to the charge voltage;
   (g) a second capacitor having a prescribed voltage value;
   (h) a charging and discharging means connected to the second capacitor, said charging and discharging means supplying charge current to the second capacitor from the time that the switch is converted from the OFF state into the ON state and discharging the second capacitor from the time that the switch is converted from the ON state into the OFF state;
   (i) a control circuit means connected to the switch and second capacitor, said control circuit means converting the switch from the ON state into the OFF state in response to the prescribed voltage value of the second capacitor; and
   (j) means for controlling a level of current supplied from the charging means to the first capacitor so as to control a level of the DC output voltage supplied to the load.

2. A DC-DC converter as set forth in claim 1, wherein the main winding comprises a primary winding of the transformer, the voltage output means comprises a secondary winding of the transformer, and the auxiliary winding comprises a tertiary winding of the transformer.

3. A DC-DC converter as set forth in claim 1, wherein the switch is a field effect transistor.

4. A DC-DC converter as set forth in claim 1, wherein the switch is a bipolar transistor.

5. A DC-DC converter as set forth in claim 1, wherein the first capacitor is connected in series to the tertiary winding.

6. A DC-DC converter as set forth in claim 2, wherein the charging means for the first capacitor comprises a resistor connected between one of the pair of input terminals and the first capacitor.

7. A DC-DC converter as set forth in claim 2, wherein the charging and discharging means for the second capacitor comprises a resistor connected between the tertiary winding and the second capacitor.

8. A DC-DC converter as set forth in claim 2, said charging means for the first capacitor comprising:
   (a) a resistor connected between one of the pair of input terminals and the first capacitor;
   (b) a quartic winding coupled in electromagnetic coupling with the primary winding;
   (c) a third capacitor connected in parallel to the quartic winding and the first capacitor respectively;
   (d) a diode connected between the quartic winding and the third capacitor; and
   (e) a resistor connected between the third capacitor and the first capacitor.

9. A DC-DC converter for supplying DC power to a load, comprising:
   (a) a pair of input terminals for connection to a DC power source;
   (b) a field effect transistor connected between the pair of input terminals and having a threshold voltage, a drain, a source and a gate, said field effect transistor being converted from an OFF state into an ON state when voltage greater than or equal to the threshold voltage of the field effect transistor is applied to the gate;
   (c) a transformer having a primary winding, a secondary winding and a tertiary winding, said primary winding being connected in series to the field effect transistor, said tertiary winding being connected between the gate and the source;
   (d) a rectifying and smoothing circuit connected between the secondary winding and the load for supplying a DC output voltage to the load;
   (e) a first capacitor connected in series to the tertiary winding;

(f) a charging means for charging the first capacitor;
(g) a second capacitor connected in parallel to the tertiary winding;
(h) a resistor connected in series to the second capacitor for charging the second capacitor to a prescribed voltage value;
(i) a transistor having a collector, an emitter and a base, said collector being connected to the gate, said emitter being connected to the source, said base being connected to the second capacitor, said transistor being turned on in response to the prescribed voltage value of the second capacitor for converting the field effect transistor from the ON state into the OFF state;
(j) a voltage detecting means connected to the rectifying and smoothing circuit for obtaining detection of a voltage corresponding to the DC output voltage;
(k) means for generating a reference voltage;
(l) an error amplifier connected to the voltage detecting means and the reference voltage generating means for obtaining an output corresponding to a difference between the detection voltage and the reference voltage; and
(m) means for controlling a charge current of the first capacitor in response to the output of the error amplifier.

10. A DC-DC converter for supplying DC power to a load, comprising:
(a) a pair of input terminals for connection to a DC power source;
(b) a switch connected between the pair of input terminals and having a control terminal, said switch being converted from an OFF state into an ON state when voltage greater than or equal to the threshold voltage of the switch is applied to the control terminal;
(c) a transformer having a primary winding, a secondary winding and a tertiary winding, said primary winding being connected in series to the switch, said tertiary winding being connected to the control terminal for supplying positive feedback voltage to the control terminal;
(d) a rectifying and smoothing circuit connected between the secondary winding of the transformer and the load for supplying a DC output voltage to the load;
(e) a first capacitor connected in series to the tertiary winding;
(f) a first resistor connected between one of the pair of input terminals and the first capacitor for charging the first capacitor;
(g) a second capacitor connected in parallel to the tertiary winding;
(h) a second resistor connected in series to the second capacitor;
(i) a current detecting means connected in series to the switch for detecting current of the switch;
(j) a control element having first and second main electrodes and a control electrode, said first main electrode being connected to the control terminal of the switch, said second main electrode being connected to the current detecting means, said control electrode being connected to the second capacitor, said control element being turned on in response to a sum of the voltage of the second capacitor and the voltage of the current detecting means for converting the switch from the ON state into the OFF state;
(k) a voltage detecting means connected to the rectifying and smoothing circuit for obtaining detection of a voltage corresponding to the DC output voltage;
(l) means for generating a reference voltage;
(m) an error amplifier connected to the voltage detecting means and the reference voltage generating means for obtaining an output corresponding to a difference between the detection voltage and the reference voltage; and
(n) means for controlling a charge current of the first capacitor in response to output of the error amplifier.

11. A DC-DC converter as set forth in claim 9 or 10, further comprising
means for controlling a charge current of the second capacitor in response to the output of the error amplifier.

12. A DC-DC converter as set forth in claims 9 or 10, further comprising a variable conducting element connected in parallel to the first capacitor for discharging the first capacitor.

13. A DC-DC converter as set forth in claims 9 or 10, further comprising a diode connected in parallel to the second capacitor.

14. A DC-DC converter for supplying DC power to a load, comprising:
(a) a pair of input terminals for connection to a DC power source;
(b) a switch, connected between the pair of input terminals, and having a control terminal and at threshold voltage, said switch being converted from an OFF state into an ON state when voltage greater than or equal to the threshold voltage of the switch is applied to the control terminal;
(c) a transformer having a main winding, an auxiliary winding and a voltage output means, said main winding being connected in series to the switch, said auxiliary winding being connected to the control terminal for supplying positive feedback voltage to the control terminal;
(d) a rectifying and smoothing circuit connected between the voltage output means of the transformer and the load for supplying DC voltage to the load;
(e) a first capacitor connected to the switch, a charge voltage of said first converting the switch from the OFF state into the ON state;
(f) a charging means for charging the first capacitor to the charge voltage;
(g) a second capacitor having a prescribed voltage value;
(h) a charging and discharging means connected to the second capacitor, said charging and discharging means supplying charge current to the second capacitor from the time that the switch is converted from the OFF state into the ON state and discharging the second capacitor from the time that the switch is converted from the ON state into the OFF state;
(i) a control circuit means connected to the switch and second capacitor, said control circuit means converting the switch from the ON state into the OFF state in response to the prescribed voltage value of the second capacitor; and
(j) means for controlling a level of current supplied from the charging and discharging means to the second capacitor so as to control a level of the DC output voltage supplied to the load; and (k) a transistor connected in parallel with the first capacitor for discharging the same, the transistor becoming conductive in response to a voltage developing across the auxiliary winding of the transformer when the switch is off.

15. A DC-DC converter as set forth in claim 14, wherein the main winding comprises a primary winding of the transformer, the voltage output means comprises a secondary winding of the transformer, and the auxiliary winding comprises a tertiary winding of the transformer.

16. A DC-DC converter as set forth in claim 14 or 15, wherein the switch is a field effect transistor.

17. A DC-DC converter as set forth in claim 14 or 15, wherein the switch is a bipolar transistor.

18. A DC-DC converter as set forth in claim 15, wherein the first capacitor is connected in series to the tertiary winding.

19. A DC-DC converter as set forth in claim 14 or 15, wherein the charging means for the first capacitor comprises a resistor connected between one of the pair of input terminals and the first capacitor.

20. A DC-DC converter as set forth in claim 15, wherein the charging and discharging means for the second capacitor comprises a resistor connected between the tertiary winding and the second capacitor.

21. A DC-DC converter as set forth in claim 15, said charging means for the first capacitor comprising:
(a) a resistor connected between one of the pair of input terminals and the first capacitor;
(b) a quartic winding coupled in electromagnetic coupling with the primary winding;
(c) a third capacitor connected in parallel to the quartic winding and the first capacitor respectively;
(d) a diode connected between the quartic winding and the third capacitor; and
(e) a resistor connected between the third capacitor and the first capacitor.

22. A DC-DC converter for supplying DC power to a load, comprising:
(a) a pair of input terminals for connection to a DC power source;
(b) a field effect transistor connected between the pair of input terminals and having a threshold voltage, a drain, a source and a gate, said field effect transistor being converted from an OFF state into an ON state when voltage greater than or equal to the threshold voltage of the field effect transistor is applied to the gate;
(c) a transformer having a primary winding, a secondary winding and a tertiary winding, said primary winding being connected in series to the field effect transistor, said tertiary winding being connected between the gate and the source;
(d) a rectifying and smoothing circuit connected between the secondary winding and the load for supplying a DC output voltage to the load;
(e) a first capacitor connected in series to the tertiary winding;
(f) a charging means for charging the first capacitor;
(g) a second capacitor connected in parallel to the tertiary winding;
(h) a resistor connected in series to the second capacitor for charging the second capacitor to a prescribed voltage value;

(i) a first transistor having a collector, an emitter and a base, said collector being connected to the gate, said emitter being connected to the source, said base being connected to the second capacitor, said first transistor being turned on in response to the prescribed voltage value of the second capacitor for converting the field effect transistor from the ON state into the OFF state;
(j) a voltage detecting means connected to the rectifying and smoothing circuit for obtaining detection of a voltage corresponding to the DC output voltage;
(k) means for generating a reference voltage;
(l) an error amplifier connected to the voltage detecting means and the reference voltage generating means for obtaining an output corresponding to a difference between the detection voltage and the reference voltage;
(m) means for controlling a charge current of the second capacitor in response to the output of the error amplifier;
(n) a second transistor connected in parallel with the first capacitor for discharging the same, the second transistor becoming conductive in response to a voltage developing across the auxiliary winding of the transformer when the switch is off.

23. A DC-DC converter for supplying DC power to a load, comprising:
(a) a pair of input terminals for connection to a DC power source;
(b) a switch connected between the pair of input terminals and having a control terminal, said switch being converted from an OFF sate into an ON state when voltage greater than or equal to the threshold voltage of the switch is applied to the control terminal;
(c) a transformer having a primary winding, a secondary winding and a tertiary winding, said primary winding being connected in series to the switch, said tertiary winding being connected to the control terminal for supplying positive feedback voltage to the control terminal;
(d) a rectifying and smoothing circuit connected between the secondary winding of the transformer and the load for supplying a DC output voltage to the load;
(e) a first capacitor connected in series to the tertiary winding;
(f) a first resistor connected between one of the pair of input terminals and the first capacitor for charging the first capacitor;
(g) a second capacitor connected in parallel to the teritary winding;
(h) a second resistor connected in series to the second capacitor;
(i) a current detecting means connected in series to the switch for detecting current of the switch;
(j) a control element having first and second main electrodes and a control electrode, said first main electrode being connected to the control terminal of the switch, said second main electrode being connected to the current detecting means, said control electrode being connected to the second capacitor, said control element being turned on in response to a sum of the voltage of the second capacitor and the voltage of the current detecting means for converting the switch from the ON state into the OFF state;

(k) a voltage detecting means connected to the rectifying and smoothing circuit for obtaining detection of a voltage corresponding to the DC output voltage;

(l) means for generating a reference voltage;

(m) an error amplifier connected to the voltage detecting means and the reference voltage generating means for obtaining an output corresponding to a difference between the detection voltage and the reference voltage;

(n) means for controlling a charge current of the second capacitor in response to the output of the error amplifier; and (o) a transistor connected in parallel with the first capacitor for discharging the same, the transistor becoming conductive in response to a voltage developing across the auxiliary winding of the transformer when the switch is off.

24. A DC-DC converter as et forth in claims 22 or 23, further comprising a diode connected in parallel to the second capacitor.

* * * * *